(12) United States Patent
Takahashi et al.

(10) Patent No.: US 6,727,448 B2
(45) Date of Patent: Apr. 27, 2004

(54) COMPOSITE SWITCH UNIT FOR VEHICLE USE PROVIDED WITH SWINGABLE DRIVE MEMBERS AT BOTH ENDS IN LENGTHWISE DIRECTION OF BOX-SHAPED HOUSING

(75) Inventors: Atsuo Takahashi, Miyagi-ken (JP); Takehiko Ito, Miyagi-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 0 days.

(21) Appl. No.: 10/217,951

(22) Filed: Aug. 13, 2002

(65) Prior Publication Data

US 2003/0075426 A1 Apr. 24, 2003

(30) Foreign Application Priority Data

Aug. 20, 2001 (JP) ........................................ 2001-249505

(51) Int. Cl.[7] ................................................. H01H 3/20
(52) U.S. Cl. .................. 200/332; 200/61.45; 200/61.27
(58) Field of Search ............................ 200/332, 61.27, 200/61.3, 61.54, 61.55, 335

(56) References Cited

U.S. PATENT DOCUMENTS

| | | | |
|---|---|---|---|
| 4,206,325 A | * | 6/1980 | Wilkinson ..................... 200/4 |
| 4,404,438 A | | 9/1983 | Honjo |
| 5,747,763 A | | 5/1998 | Uchiyama et al. |
| 5,831,231 A | * | 11/1998 | Uchiyama ................ 200/61.54 |
| 5,895,899 A | * | 4/1999 | Sano ........................ 200/61.54 |
| 6,236,004 B1 | * | 5/2001 | Stadler et al. ........... 200/61.28 |
| 6,437,264 B1 | * | 8/2002 | Mizuta et al. ........... 200/61.54 |
| 6,444,929 B1 | * | 9/2002 | Schwartz et al. ........ 200/61.54 |

* cited by examiner

Primary Examiner—R. K. Lee
(74) Attorney, Agent, or Firm—Brinks Hofer Gilson & Lione

(57) ABSTRACT

A plurality of switchable contacts are provided on a relaying printed circuit board for centralized relaying of signals between a vehicle per se and a switch unit; a plurality of contact change-over members for connecting and disconnecting the switchable contacts are mounted on this printed circuit board; a drive member oscillatable from outside to inside of a box-shaped housing is fitted to each end of the housing in a lengthwise direction; the printed circuit board is fixed to an outer part of an under face of the housing to cause the contact change-over members to face the inside of the housing; the drive members and the contact change-over members are engaged with each other to oscillate the drive members; and the switchable contacts on the printed circuit board are thereby changed over.

6 Claims, 6 Drawing Sheets

10

COMPOSITE SWITCH UNIT FOR VEHICLE USE PROVIDED WITH SWINGABLE DRIVE MEMBERS AT BOTH ENDS IN LENGTHWISE DIRECTION OF BOX-SHAPED HOUSING

BACKGROUND OF THE INVENTION

1. Field of the Invention

The present invention relates to a composite switch unit for vehicle use for changing over various vehicle-mounted functions, and more particularly to a composite switch unit positioned in the vicinity of the steering wheel.

2. Description of the Prior Art

To explain drawings of a composite switch unit for vehicle use according to the prior art, FIG. 4 shows a schematic exploded perspective view of the prior art composite switch unit for vehicle use; FIG. 5, a schematic section of the essential part of the prior art composite switch unit for vehicle; FIG. 6, a vertical section of one side of the essential part of the prior art composite switch unit for vehicle use; and FIG. 7, a horizontal section of the same side of the essential part of the prior art composite switch unit for vehicle use of FIG. 6.

Next to describe the configuration of the prior art composite switch unit for vehicle use, as shown in the schematic diagrams of FIG. 4 and FIG. 5, a casing 50 is an insulating resin body having a relatively large overall length and an inverted U shape. In the right and left walls and the ceiling are provided guide grooves 50a, and the ceiling also has a central hole 50b near the center of the top face of the casing 50. Around the central hole 50b, on the top face of the casing 50 are provided a plurality of guide stubs 50c, and between the guide stubs 50c and the central hole 50b are bored holes 50d.

A rotary connector 53 consists of an insulating resin-made cylindrical fixed body 53a and an insulating resin-made movable body 53b rotatably fitted to the fixed body 53a and having a cylindrical hole 53i, and a flat cable 53h is wound in the cylindrical space demarcated by these fixed body 53a and movable body 53b to electrically connect the fixed body 53a and the movable body 53b. The under face of the fixed body 53a and the top face of the movable body 53b are provided with a connector 53c and a connector 53d, respectively, for electrical connection to the outside. On the upper edge of the cylindrical outer wall of the fixed body 53a are provided a plurality of protrusions 53f protruding in the horizontal direction, and the plurality of protrusions 53f have a plurality of holes 53e. The plurality of protrusions 53f are guided by the plurality of guide stubs 50c of the casing 50, and bolts 53g penetrate the holes 53e and the holes 50d to fix the fixed body 53a to the periphery of the central hole 50b of the casing 50.

A winker side stalk switch 51 which is on one side of the composite switch unit for vehicle use, as schematically illustrated in FIG. 4 and FIG. 5, has an insulating resin-made, rod-shaped lever 51a and a box-shaped base body 60 to which this lever 51a is fitted. On the surrounding edge of the base body 60, a connector 51c is provided on the other face than that to which a plurality of guide stubs 51b and the lever 51a of the base body 60 are fitted.

To describe the base body 60 with reference to FIG. 6 and FIG. 7, an upper case 60a and a lower case 60b, both made of insulating resin, protect the base body 60 by covering it from above and underneath, and have opposite shaft holes.

A thin and long working member 60c, made of insulating resin, is fixed to the lever 51a to communicate the oscillating motion of the lever 51a and invades into the base body 60, and a long hole 60f opens in the invading direction. A holder 60e, an insulating resin-made structure, is accommodated between the upper and lower cases 60a and 60b, and has two shafts (not shown) protruding in the horizontal direction and another pair of protruding shafts 60j and 60k protruding in the vertical direction. The holder 60e also has a spring shoe 60m inside. Protruding shafts of the holder 60e are snapped into shaft holes 60d of the working member 60c to make the lever 51a fixed to the working member 60c oscillatable in the directions of arrow a-b. The protruding shafts 60j and 60k of the holder 60e are snapped into opposite shaft holes of the upper and lower cases 60a and 60b, and the holder 60e is oscillatable relative to the upper and lower cases 60a and 60b in the directions of arrow c-d of the lever 51a.

An insulating resin-made cap 60h, whose tip is formed hemispherically, is snapped onto the tip of a first coil spring 60g. The first coil spring 60g to which the cap 60h is fitted is accommodated in the hole 60f of the working member. A first cam wheel assembly 60i has one or more insulating resin-made cam wheels, and is formed in a position in a part of the holder 60e, opposite the hole 60f of the working member 60c. The cap 60h is elastically suppressed as an elastic suppressing portion against the first cam wheel assembly by the elastic force of the first coil spring 60g.

An insulating resin-made cap 60n, whose tip is formed hemispherically, is snapped onto the tip of a second coil spring 60l. The second coil spring 60l to which the cap 60n is fitted is borne by the spring shoe 60m provided on the holder 60e. A second cam wheel assembly 60o has two insulating resin-made cam wheels 60q and a central trough 60p between them, and is integrated with the lower case 60b. The cam wheel faces are provided opposite the cap 60n snapped onto the tip of the second coil spring. The cap 60n is elastically suppressed as an elastic suppressing portion against the second cam wheel assembly 60o by the elastic force of the coil spring 60l.

A contact change-over member 60s has a hole 60w in its insulating resin-made body, to which a movable contact 60v is fitted. A protrusion 60w protruding from the working member 60c is inserted into the hole of the contact change-over member 60s, and the movable contact 60v moves with the oscillation of the lever 51a fixed to the working member 60c in the directions of arrow a-b. Another contact change-over member 60t has a protrusion and a movable contact 60u in its insulating resin-made body, whose protrusion is in contact with and squeezed by a wall 60x of the holder 60e, and the movable contact 60u is moved as the wall 60x is interlocked with the oscillation of the lever 51a in the directions of arrow c-d.

A printed circuit board 60r is fitted to the lower case 60b, and on its surface is provided switchable contacts (not shown) for changing over various functions of the vehicle. To an end of the printed circuit board 60r is fitted a connector 51c to guide outside the signals of the switchable contacts via a connecting conductor 51d of the connector 51c. The winker side stalk switch 51, which changes over from one contact to another by having the contact change-over members 60s and 60t slide over and in contact with the switchable contacts, is snapped on and fixed to the casing 50 by inserting the plurality of guide stubs 51b on the peripheral edge of its base body 60 into the guide grooves 50a in the right and left inner walls and the ceiling of the casing 50.

A window wiper side stalk switch 52, which is on the other side of the composite switch unit for vehicle use is substantially the same in structure as the winker side stalk switch, and therefore its detailed description will be dispensed with.

The window wiper side stalk switch 52 is snapped on and fixed to the casing 50 by inserting the plurality of guide stubs 52b on the peripheral edge of its base body 61 into the guide grooves 50a in the right and left inner walls and the ceiling of the casing 50.

A rectangularly shaped relaying printed circuit board 54 has a hole 54a at the center, is mounted with a connector 54b, a connector 54c and a connector 54d. From these three connectors, wiring is laid via leads (not shown) on the printed circuit board 54, and these leads are gathered on the back face of the printed circuit board 54 via through holes to be concentrated on another connector 54e mounted on the back face of the printed circuit board thereby to relay signals to the vehicle per se.

The relaying printed circuit board 54 is fitted and fixed to the lower edge of the casing 50. If, when it is fitted, the rotary connector 53 is caused to be guided by the plurality of guide stubs 50c to be inserted into the hole 50b of the casing 50, the connector 53c on the lower edge of the rotary connector 53 is snapped on and connected to the connector 54b mounted on the relaying printed circuit board 54. Then, as the plurality of guide stubs 51b of the winker side stalk switch 51 are inserted into the guide grooves 50a of the casing 50 in the direction reverse to the lever 51a and snapped on for fixation, the connector 51c provided on the base body 60 of the winker side stalk switch 51 on the other face than where the lever 51a is fitted is snapped on and connected to the connector 54d fitted to the relaying printed circuit board 54.

When the window wiper side stalk switch 52 is snapped on and fixed by inserting its plurality of guide stubs 52b into the guide grooves 50a of the casing 50, a connector 52c (though not shown, it is for an output from an printed circuit board inside like that for the winker side stalk switch 51) provided on the face of the base body 61 of the window wiper side stalk switch 52 reverse to where a lever 52a is fitted is snapped on and connected to the connector 54c fitted to the relaying printed circuit board 54. The cylindrical hole 53i of the movable body 53b of the rotary connector 53 and the central hole 54a of the relaying printed circuit board 54 are formed concentrically, and a steering shaft is pressed into them after final assembly.

Next will be described the oscillating action of the lever 51a of the winker side stalk switch 51 and the resultant driving of the contact change-over members 60s and 60t. As shown in FIG. 6, when the lever 51a is oscillated in the directions of arrow a-b pivoting on the shaft hole 60d provided in the working member 60c fixed to the lever 51a, as the insulating resin-made cap 60h snapped onto the tip of the first coil spring 60g is elastically suppressed by the first cam wheel assembly 60i formed in part of the holder 60e, the motion of the cap 60h to go over a cam wheel gives the lever 51a a feel of click and causes the lever 51a to be latched into a prescribed position. At the same time, as the protrusion 60w protruding from the working member 60c fixed to the lever 51a engages with a hole in the contact change-over member 60s along with the oscillation of the lever 51a to drive the contact change-over member 60s, the movable contact 60v of the contact change-over member 60s slides over, keeping contact with, the opposite printed circuit board 60r to give a high beam signal to turn on a high beam lamp (not shown).

When the lever 51a is oscillated in the directions of arrow c-d around the protruding shafts 60j and 60k at the ends of the holder 60e, the insulating resin-made cap 60n snapped onto the tip of the thin and long second coil spring 60l, as it is elastically suppressed by the second cam wheel assembly 60o integrated with the lower case 60b, gives a feel of click to the lever 51 and latches the lever 51a in a prescribed position when it goes over the cam wheel 60q. At the same time, the wall 60x of the holder 60e, moving integrally with the lever 51a, drives the protrusion of the contact change-over member 60t in contact with that wall along with the oscillation of the lever 51a, the movable contact 60u slides over, keeping contact with, the opposite printed circuit board 60r, and is driven by the rotational operation of the lever 51a to turn right of left and thereby to light the right turning or left turning lamp (not shown) intermittently.

As described the feel of click resulting from the oscillation of the lever 51a in the directions of arrow a-b is created by the cap 60h and the cam wheel assembly 60i, the feel of click resulting from the oscillation of the lever 51a in the directions of arrow c-d is created by the cap 60n and the cam wheel assembly 60o. This use of different caps different cam wheels for the two purposes complicates the structure.

Since the oscillating action of the lever 52a of the window wiper side stalk switch 52 is substantially the same as that of the lever 51a of the winker side stalk switch 51, its detailed description will be dispensed with, but it may be sufficient to note here that the functions changed over by the oscillation action of the lever 52a of the window wiper side stalk switch 52 are speed control of the window wipers and the discharge of the window washer liquid.

According to the prior art described above, each stalk switch is provided with a printed circuit board, which then is provided with connectors, which in turn are connected to a relaying printed circuit board. This configuration according to the prior art requires a plurality of printed circuit boards and accordingly involves greater trouble of assembling and, moreover, the use of connectors between each stalk switch and the relaying printed circuit board entails the problem of inadequate reliability of electrical connection.

SUMMARY OF THE INVENTION

Therefore, an object of the present invention is to provide a composite switch unit for vehicle use using a smaller number of printed circuit boards, easier to assemble and more reliable in electrical connection.

In order to solve the problems noted above, a composite switch unit for vehicle use according to the invention is provided with a plurality of switchable contacts on a relaying printed circuit board for centralized relaying of signals between a vehicle per se and the switch unit, wherein a plurality of contact change-over members for connecting and disconnecting the switchable contacts are mounted on the printed circuit board; a drive member oscillatable from outside to inside of a box-shaped housing is fitted to each end of the housing in a lengthwise direction; the printed circuit board is fixed to an outer part of an under face of the housing to cause the contact change-over members to face the inside of the housing; the drive members and the contact change-over members are engaged with each other to oscillate the drive members; and the contact change-over members are thereby driven to change over the switchable contacts on the printed circuit board.

This configuration makes it possible to provide a composite switch unit for vehicle use reduced in the number of printed circuit boards to be used, easier to assemble and increased in the reliability of electrical connection.

In the composite switch unit for vehicle use according to the invention, each of the drive members may include a lever assembly protruding outside the housing, an oscillating body provided within the housing and a cam wheel assembly; the cam wheel assembly has a cam wheel whose elastically suppressed portion protruding to an inner end of the lever assembly is suppressed; the lever assembly is given a feel of click matching an oscillating position of the lever assembly; and the cam wheel assembly is fitted detachably to the housing.

This configuration makes it easier to change the feel of click because it can be changed by replacing only the cam wheel assembly with a differently prepared one.

In the composite switch unit for vehicle use according to the invention, the lever assembly may be borne by the oscillating body to be oscillatable in fixed directions; and the oscillating body is borne by the housing in directions substantially orthogonal to the fixed directions.

This configuration makes possible oscillation in two directions in a simple structure.

In the composite switch unit for vehicle use according to the invention, one of the elastically suppressed portions may be provided for one unit of the lever assembly, and the elastically suppressed portion is suppressed by the cam wheel to move in mutually orthogonal directions over the cam wheel.

As this configuration requires only one elastically suppressed portion, the overall structure of the composite switch unit for vehicle use is simplified.

The composite switch unit for vehicle use according to the invention may have a cover for covering the relaying printed circuit board jointly with the housing.

Since in this configuration the relaying printed circuit board is covered by both the housing and the cover, the relaying printed circuit board can be protected from dust.

In the composite switch unit for vehicle use according to the invention, the relaying printed circuit board may be provided with lead conductors for collectively leading signals of the plurality of switchable contacts toward the vehicle per se.

This configuration can accomplish connection of signals to the vehicle per se simply with a connector using lead conductors.

DETAILED DESCRIPTION OF THE PREFERRED EMBODIMENT

Figure 1:
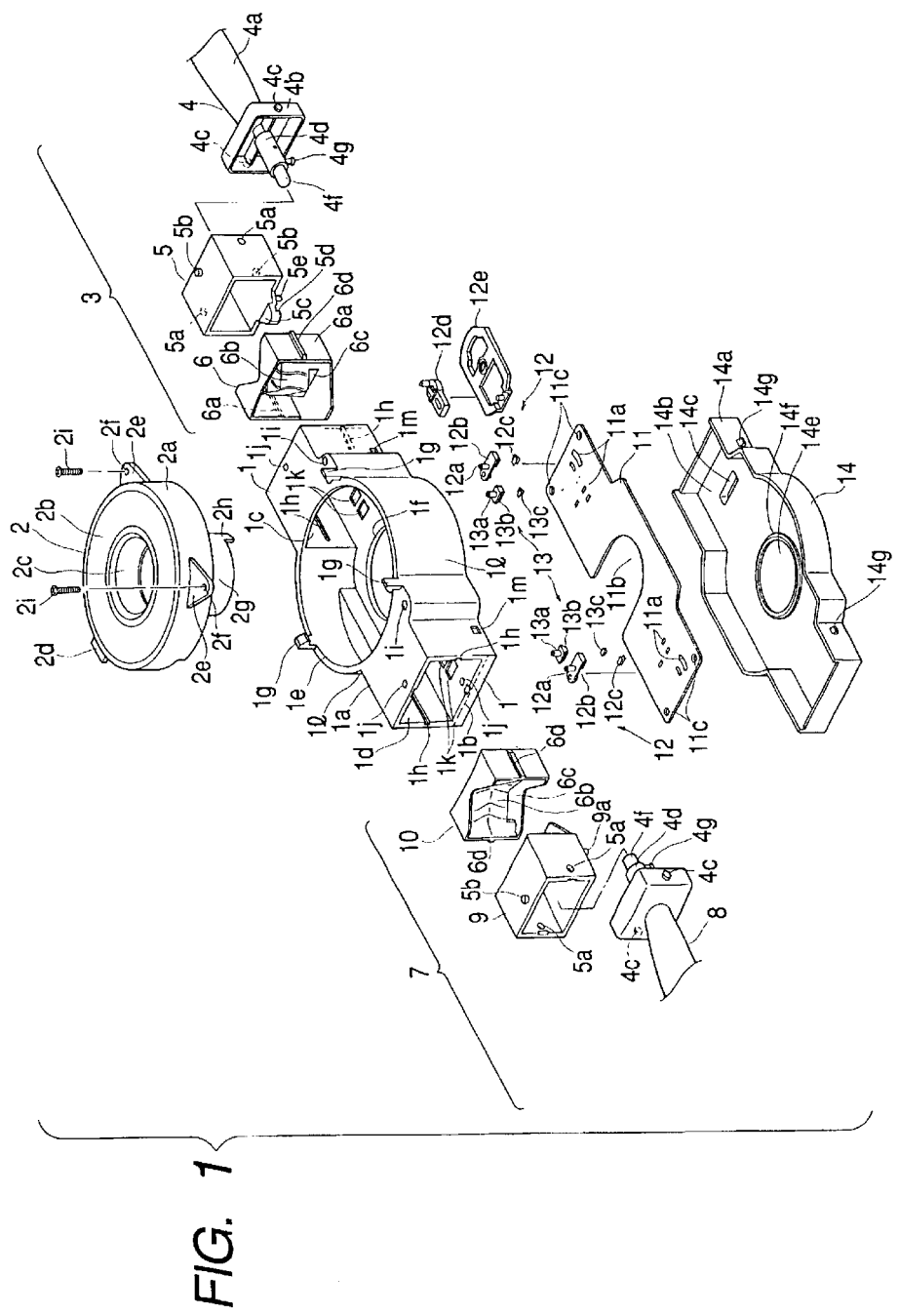
FIG. 1 shows a schematic exploded perspective view of a composite switch unit for vehicle use, which is a preferred embodiment of the present invention.
Figure 2:
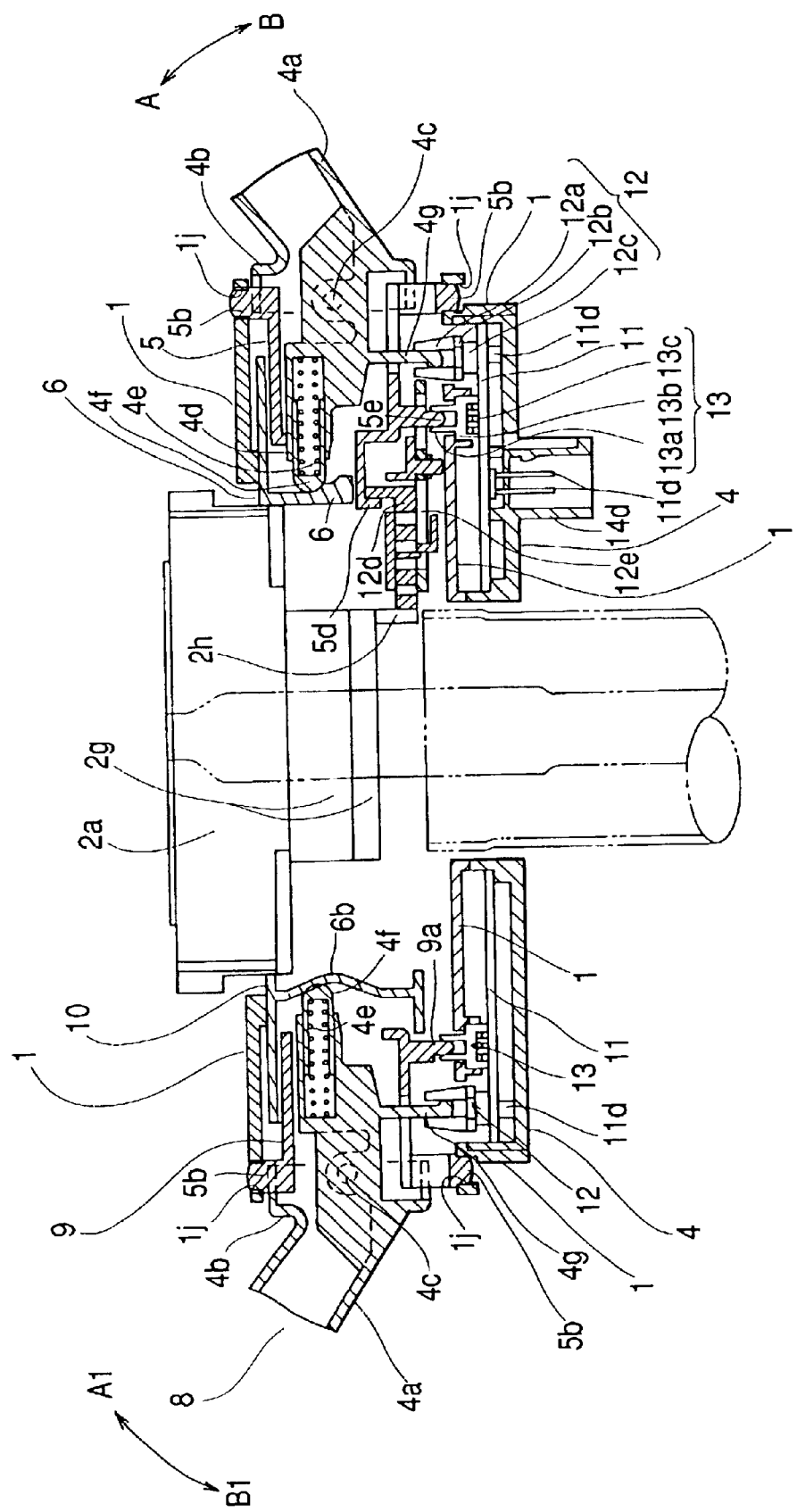
FIG. 2 shows a schematic cross section of the essential part of the composite switch unit for vehicle use, which is the preferred embodiment of the invention.

To explain the drawings of a composite switch unit for vehicle use, which is a preferred embodiment of the present invention, FIG. 1 shows a schematic exploded perspective view of a composite switch unit for vehicle use, which is the embodiment of the invention; FIG. 2, a schematic cross section of the essential part of the composite switch unit for vehicle use embodying the invention; and FIG. 3, a vertical section of one side of the essential part of the composite switch unit for vehicle use embodying the invention.

Figure 3:
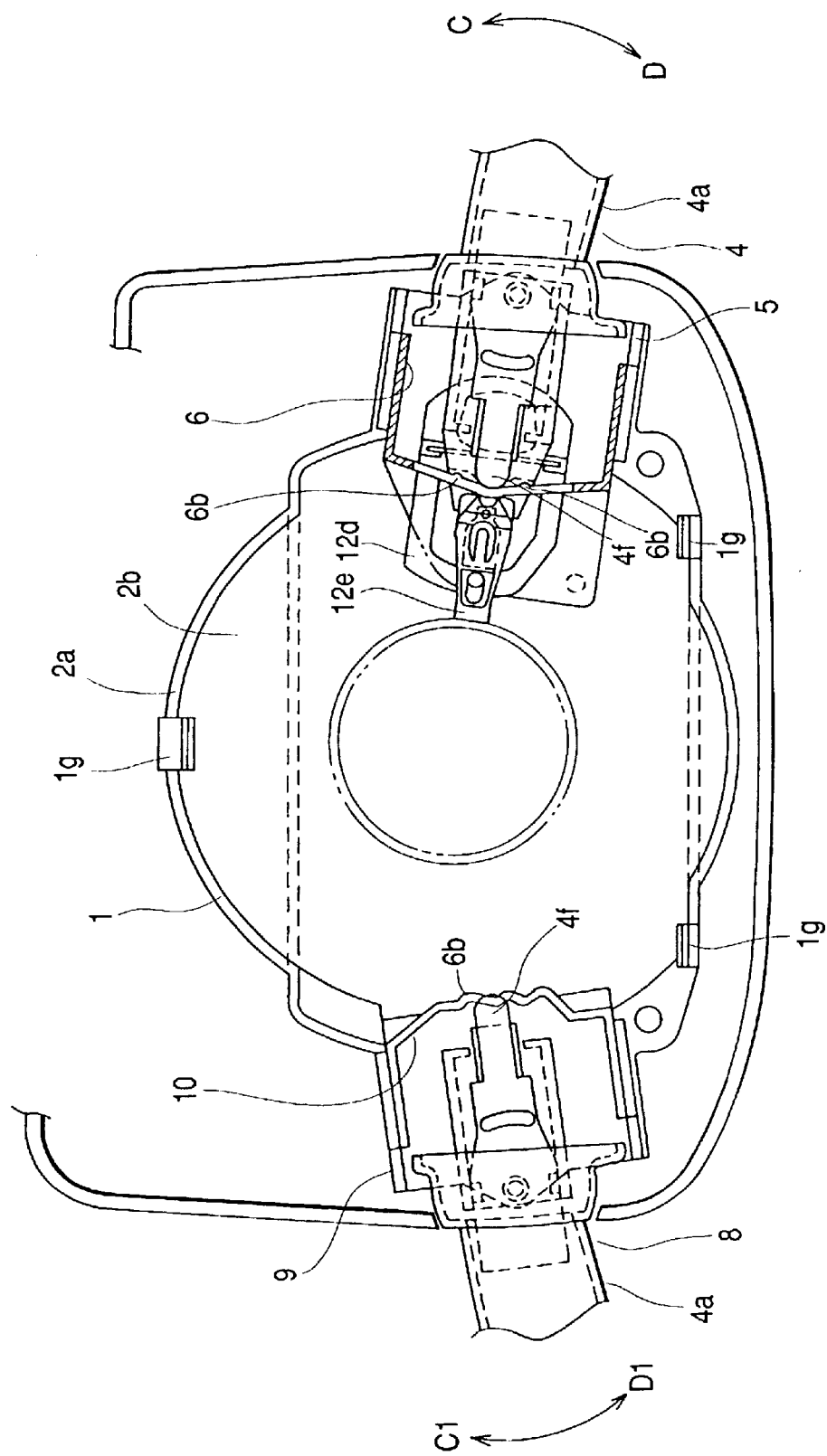
FIG. 3 shows a vertical section of one side of the essential part of the composite switch unit for vehicle use, which is the preferred embodiment of the invention.
Figure 4:
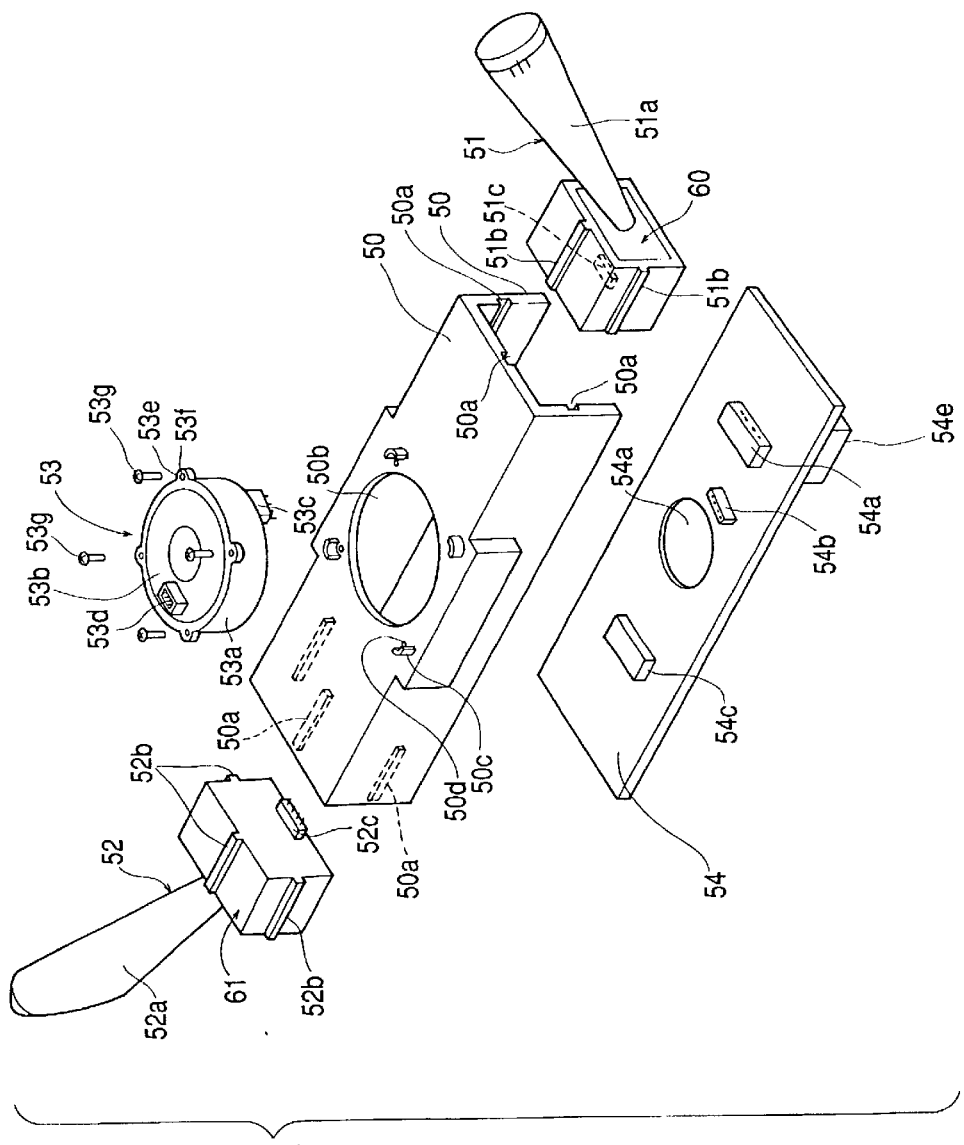
FIG. 4 shows a schematic exploded perspective view of a composite switch unit for vehicle use according to the prior art.
Figure 5:
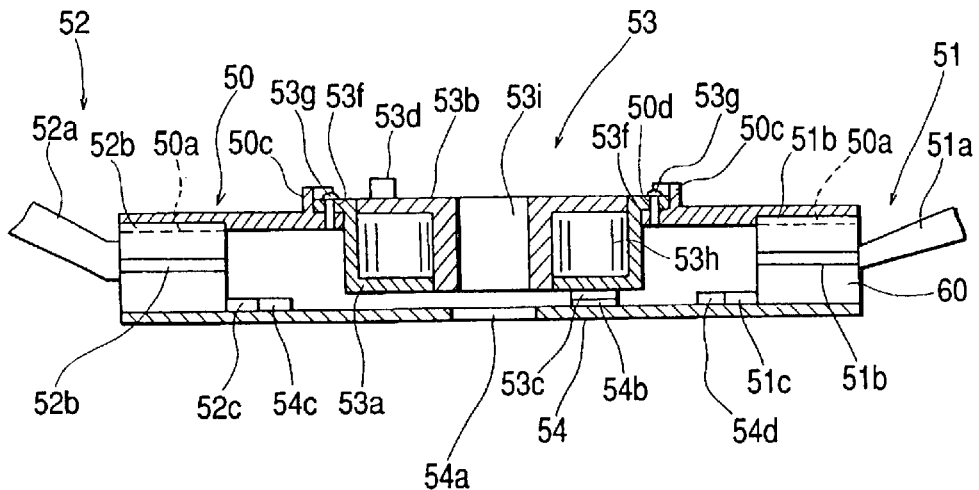
FIG. 5 shows a schematic section of the essential part of the composite switch unit for vehicle according to the prior art.
Figure 6:
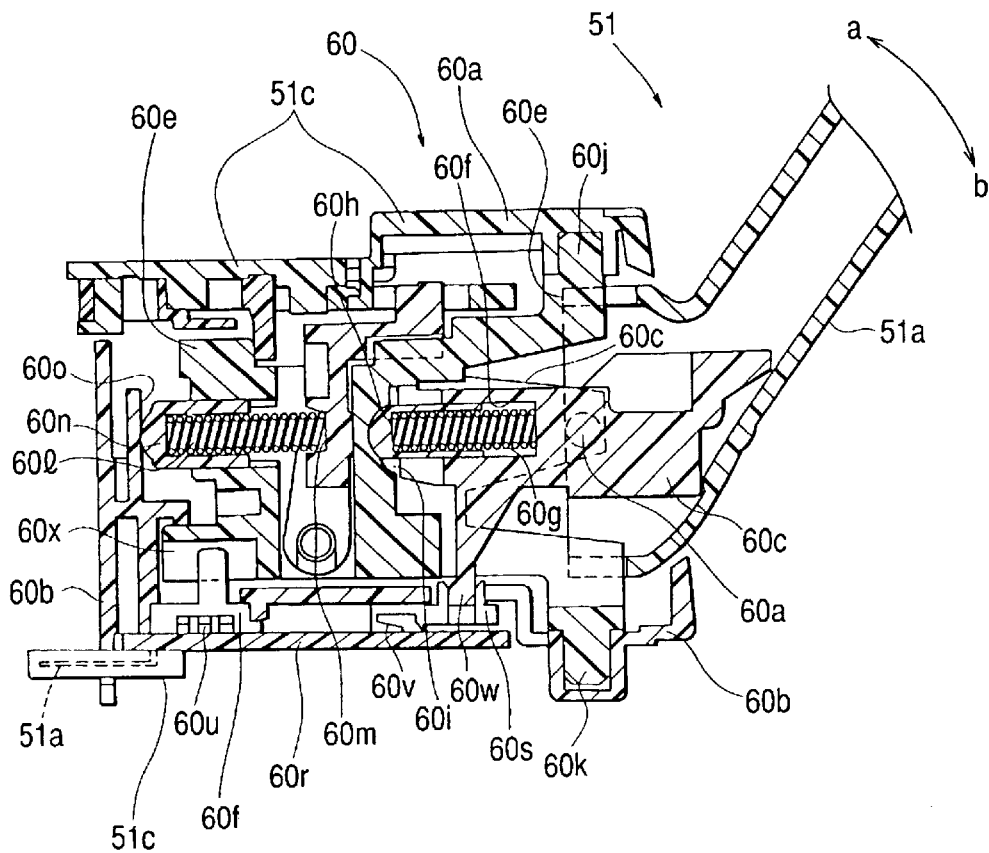
FIG. 6 shows a vertical section of one side of the essential part of the composite switch unit for vehicle use according to the prior art.
Figure 7:
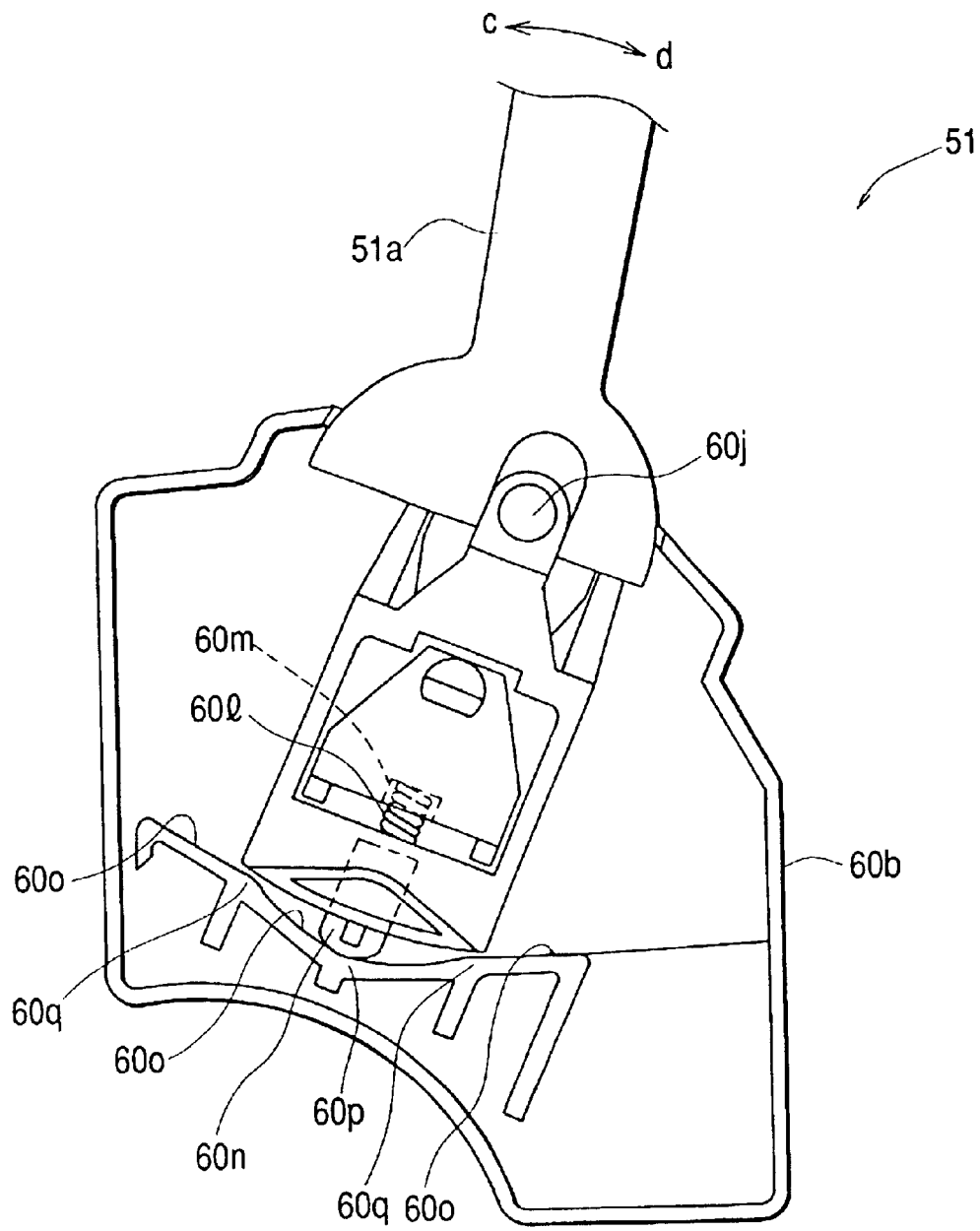
FIG. 7 shows a horizontal section of the same side of the essential part of the composite switch unit for vehicle use according to the prior art shown in FIG. 6.

Next will be described the configuration of the switch unit for vehicle use according to the invention with reference to FIG. 1 through FIG. 3.

A housing 1, as shown in FIG. 1, is an insulating resin-made long box provided with a rectangular open hole 1c at one end of its length, a rectangular open hole 1d at the other end of the same. In the right and left walls of each of the open holes 1c and 1d are provided guide grooves 1h and 1h, at the center of the upper and lower sides of each of the open holes 1c and 1d are bored the shaft holes 1j and 1j. At the substantial center of the upper face 1a of the housing 1 is bored a large the central hole 1e, and at the substantial center of the lower face 1b of the housing 1 is bored a small central hole 1f. On the peripheral edge of the central hole 1e of the upper face 1a are integrally formed three key-shaped stubs 1g at substantially equal intervals, and near two of the stubs 1g are bored holes 1i and 1i. In the lower face 1b of the housing 1 are bored four rectangular holes 1k. At the lower ends of both side faces 1l and 1l of the housing 1 are bored a pair each of holes 1m and 1m at a distance from each other in the lengthwise direction of the housing.

A rotary connector 2 is configured of an insulating resin-made cylindrical fixed body 2a and an insulating resin-made movable body 2b rotatably fitted to this fixed body 2a and having a cylindrical hole 2c. A flat cable (not shown) is wound in a cylindrical space formed by these fixed body 2a and movable body 2b to establish electrical connection between the fixed body 2a and the movable body 2b. In the lower part of the movable body 2b is provided a cylindrical extending part 2g, and the extending part 2g has a stub 2h protruding downward. On the cylindrical outer wall of the fixed body 2a are integrally formed a rectangular protrusion and two trapezoids 2e at a prescribed distance from each other, and each of the trapezoids 2e has a hole 2f. The rotary connector 2 is inserted into the central hole 1e of the upper face 1a of the housing 1. The rectangular protrusion of the rotary connector 2 engages with the key-shaped stubs 1g of the housing, and the two trapezoids 2e and 2e of the rotary connector 2 also engage with the key-shaped stubs 1g. Using the holes 2f and 2f of the two trapezoids 2e and 2e, fixing bolts 2i and 2i are screwed into the holes 1i and 1i of the upper face 1a of the housing 1 to fix the housing 1 and the rotary connector 2 to each other.

One drive member 3 is configured of a lever assembly 4, an oscillating body 5 and a cam wheel assembly 6. The lever assembly 4, consisting of an insulating resin, is a rod in overall shape. At the tip of a lever 4a is integrally formed a rectangular frame 4b, and on the side edges of the frame 4b are symmetrically provided a pair of protruding shafts 4c, protruding in reverse directions to each other. An insulating resin-made cylinder 4d is fixed protrusively to the frame 4b in the direction reverse to that in which the lever 4a protrudes, and the cylinder 4d accommodates a coil spring 4e inside, and a cap 4f, exposed out of the cylinder 4d, is snapped onto the tip of the coil spring 4e. A rod-shaped first drive unit 4g protruding from the cylinder 4d at a right angle is integrally formed with the cylinder 4d.

The oscillating body 5, made of insulating resin, constitutes a cubic frame deprived of the top and bottom faces, with one pair of mutually opposite faces provided with shaft holes 5a and 5a and the other pair of mutually opposite faces provided with protruding shafts 5b and 5b in mutually opposite positions. On one of the faces having protruding shafts, a protrusion 5c having at its lower end a protruding second drive unit 5e and at its tip an engaging part 5d and protruding toward the surface is formed integrally with the oscillating body 5. The cam wheel assembly 6, made of insulating resin, accommodates in its frame 6a a cam wheel 6b having lobes in two directions, has an insertion inlet 6c between the cam wheel 6b and one wall of the frame 6a, and has on the opposite frame of the frame 6a guide protrusions 6d and 6d.

The cam wheel assembly 6 is fixed by being slid and snapped into guide grooves 1h and 1h in both right and left walls of the rectangular open hole 1c in the housing 1. The oscillating body 5 is inserted into the open hole 1c of the housing 1 behind the cam wheel assembly 6, and linked oscillatably to the housing 1 as the protruding shafts 5b and 5b provided on mutually opposite faces of the oscillating body 5 are borne by the shaft holes 1j and 1j provided on the upper and lower sides of the open hole 1c in the housing 1. The protrusion 5c having at its lower end the protruding second drive unit 5e and at its tip the engaging part 5d is inserted from the insertion inlet 6c provided adjacent to the cam wheel 6b of the cam wheel assembly 6, and arranged within the housing.

The lever assembly 4 is linked oscillatably to the oscillating body 5 as the protruding shafts 4c on side edges of its frame 4b are snapped into the shaft holes 5a and 5a of the oscillating body 5. Therefore, the lever 4a is enabled to oscillate at a substantially right angle to and from the housing 1. The cap 4f snapped onto the tip of the coil spring 4e on the reverse side of the lever assembly 4 to the lever 4a is in contact with the cam wheel 6b of the cam wheel assembly 6 to suppress the cam wheel 6b as an elastic suppressing portion. The protrusive first drive unit 4g protruding from the cylinder 4d of the lever assembly 4 is positioned within the housing 1 after the incorporation of the lever assembly 4, the oscillating body 5 and the cam wheel assembly 6 is completed.

The other drive member 7 is configured of a lever assembly 8, an oscillating body 9 and a cam wheel assembly 10. Description of the structures of the lever assembly 8, the oscillating body 9 and the cam wheel assembly 10 is dispensed with here because they are substantially the same as those of the lever assembly 4, the oscillating body 5 and the cam wheel assembly 6, respectively, of the drive members 3, with the same reference numbers being assigned to respectively the same constituent parts.

A relaying printed circuit board 11 has on its front face switchable contacts 11a for changing over various functions for use on the vehicle. In its central part is provided a U-shaped cove 11b; in its four corners holes 11c for fitting use; and on the back side, lead conductors 11d for leading from the back side the switchable contacts 11a on the front side.

A first contact switching member 12 is configured of a hold 12a, a body 12b and a movable contact 12c. As the hold 12a is driven, the movable contact 12c fixed to the body 12b is moved. A second contact switching member 13 is configured of a hold 13a, a body 13b and a movable contact 13c. As the hold 13a is driven, the movable contact 13c fixed to the body 13b is moved. The first and second contact switching members 12 and 13 slide over the relaying printed circuit board 11 in contact with it, and the movable contacts 12c and 13c connect and disconnect each of the switchable contacts 11a on the relaying printed circuit board 11.

Into the hold 12a of the first contact switching member 12 of the drive member 3 is inserted and snapped on the first drive unit 4g of the lever assembly 4 via some of the rectangular holes 1k of the housing 1, and into the hold 13a of the second contact switching member 13 is inserted and snapped on the second drive unit 5e of the oscillating body 5 via the other rectangular holes 1k of the housing 1.

A first cancel lever 12e and a second cancel lever 12d are combined to be rotatable relative to each other. The second cancel lever is engaged not to move in the inner side of the radius by the engaging part 5d of the oscillating body 5 so that, when the steering wheel is in the neutral position, the second cancel lever may not come into contact with the stub 2h of the extending part 2g underneath the movable body 2b of the rotary connector 2.

Into the hold 12a of the first contact switching member 12 of the other drive member 7 is inserted and snapped on the first drive unit 4g of the lever assembly 8 via some of the rectangular holes 1k the housing 1, and into the hold 13a of the second contact switching member 13 is inserted and snapped on the second drive unit 9a of the oscillating body 9 via the other rectangular holes 1k of the housing 1.

A cover 14, made of insulating resin and shaped like a boat, has side walls 14a and a bottom plate 14b covering the bottom sides of these side walls, and the bottom plate 14b is provided with a connector hole 14c and at the center a central hole 14e, on whose peripheral edge is arranged an annular stepped elevated part 14f. On the back side of the bottom plate 14b is provided a connector accommodating wall 14d on the peripheral edge of the connector hole 14c. Further on the side walls 14a are arranged a plurality of stubs 14g protruding outward. The U-shaped cove of the relaying printed circuit board 11 is positioned with the stepped portion of the stepped elevated part 14f. The relaying printed circuit board 11 is positioned by snapping on cylindrical spacers 11d into the fitting holes 11c of the relaying printed circuit board 11 to determine the spacing from the cover, snapping on the cover 14 inside side walls 1l of the housing 1, and engaging the stubs 14g on the side walls of the cover 14 with the respectively corresponding ones of the holes 1m of the side faces 1l of the housing 1, and the relaying printed circuit board 11 is thereafter held between the housing 1 and the cover 14.

Next will be described how the composite switch unit for vehicle use according to the present invention is operated by manipulating the two drive members 3 and 7.

The drive member 3 is a winker side composite switch installed around the steering wheel of the vehicle. As shown in FIGS. 1 through 3, when the lever 4a oscillates pivoting on a shaft hole 4c in the directions of arrow A-B, because the insulating resin-made cap 4f snapped onto the tip of the coil spring 4e is elastically suppressed as an elastic suppressing portion against the cam wheel 6b of the cam wheel assembly 6 of the drive member 3, the lever 4a is given a feel of click when the cap 4f goes over the cam wheel 6b. At the same time, along with the oscillation of the lever 4a, the first drive unit 4g protruding from the cylinder 4d of the lever assembly 4 is inserted into and snapped onto the hole in the hold 12a of the contact switching members 12 to drive the contact switching members 12, with the result that the movable contact 12c slides over the relaying printed circuit board 11 in contact with it, turns on the switchable contacts 11a to provide a high beam signal, and turns on a high beam lamp (not shown).

When the lever 4a is oscillated in the directions of arrow C-D (the planar directions substantially normal to the directions of arrow A-B) by oscillating the oscillating body 5 pivoting on the shaft holes 1j and 1j of the housing, as the insulating resin-made cap 4f snapped onto the tip of the coil spring 4e is elastically suppressed as an elastically suppressed portion by the cam wheel 6b of the cam wheel assembly 6, the lever 4a is given a feel of click when the cap 4f goes over the cam wheel 6b, and is latched in a prescribed position. At the same time, along with the oscillation of the lever 4a in the directions of arrow C-D, the second drive unit 5e of the oscillating body 5 moving integrally with the lever 4a in the directions of arrow C-D inserted into and snapped onto the hole in the hold 13a of the second contact switching member 13, with the result that the movable contact 13c slides over the relaying printed circuit board 11 in contact with it with the drive of the hold 13a, and turns on the switchable contacts 11a to light intermittently the vehicle's right turning or left turning lamp (not shown) intermittently. Thus for the drive member 3, one cam wheel assembly 6 and one cap 4f snapped onto the tip of the coil spring 4e are used in common for providing a feel of click in two kinds of oscillating directions of the lever 4a including those of arrow A-B and those of arrow C-D.

The other drive member 7 is a window wiper side composite switch installed around the steering wheel of the vehicle. Since the oscillating actions of the lever 4a of the window wiper side composite switch are substantially the same as those of the lever 4a of the winker side composite switch, description of the mechanical operation will be dispensed with, but, as shown in FIGS. 1 through 3, the function to be changed over by the oscillation of the lever 4a is the wiping speed in the directions of arrow C1-D1 while it is the discharge of the window washing liquid in the directions of arrow A1-B1. For this other drive member 7, too, one cam wheel assembly 10 and one cap 4f snapped on to the tip of the coil spring 4e are used in common for providing a feel of click in two kinds of oscillating directions of the lever 4a including those of arrow A1-B1 and those of arrow C1-D1.

As hitherto described, the composite switch unit for vehicle use according to the present invention is provided with a plurality of switchable contacts on its relaying printed circuit board for centralized relaying of signals between the vehicle per se and the switch unit; a plurality of contact change-over members for connecting and disconnecting the switchable contacts are mounted on this printed circuit board; a drive member oscillatable from outside to inside of the housing is fitted to each end of the box-shaped housing in the lengthwise direction; the printed circuit board is fixed to the outer part of the under face of the housing to cause the contact change-over members to face the inside of the housing; the drive members and the contact change-over members are engaged with each other to oscillate the drive members; and the switchable contacts on the printed circuit board are thereby changed over, with the result that a composite switch unit for vehicle use reduced in the number of printed circuit boards to be used, easier to assemble and increased in the reliability of electrical connection can be provided.

What is claimed is:

1. A composite switch unit for vehicle use comprising a plurality of switchable contacts on a relaying printed circuit board for centralized relaying of signals between a vehicle per se and the switch unit, wherein a plurality of contact change-over members for connecting and disconnecting the switchable contacts are mounted on the printed circuit board, wherein a drive member oscillatable from outside to inside of a box-shaped housing is fitted to each end of the housing in a lengthwise direction, wherein the printed circuit boar is fixed to an outer part of an under face of the housing to cause the contact change-over members to face the inside of the housing, wherein the drive members and the contact change-over members are engaged with each other to oscillate the drive members, and wherein the contact change-over members are thereby driven to change over the switchable contacts on the printed circuit board.

2. The composite switch unit for vehicle use according to claim 1, wherein each of the drive members includes a lever assembly protruding outside the housing, an oscillating body provided within the housing and a cam wheel assembly, wherein the cam wheel assembly has a cam wheel whose elastically suppressed portion protruding to an inner end of the lever assembly is suppressed, wherein the lever assembly is given a feel of click matching an oscillating position of the lever assembly, and wherein the cam wheel assembly is fitted detachably to the housing.

3. The composite switch unit for vehicle use according to claim 2, wherein the lever assembly is borne by the oscillating body to be oscillatable in fixed directions, and wherein the oscillating body is borne by the housing in directions substantially orthogonal to the fixed directions.

4. The composite switch unit for vehicle use according to claim 2, wherein one of the elastically suppressed portion is provided for one unit of the lever assembly, and wherein the elastically suppressed portion is suppressed by the cam wheel to move in mutually orthogonal direction over the cam wheel.

5. The composite switch unit for vehicle use according to claim 1, further comprising a cover for covering the relaying printed circuit board jointly with the housing.

6. The composite switch unit for vehicle use according to claim 1, wherein the relaying printed circuit board is provided with lead conductors for collectively leading signals of the plurality of switchable contacts toward the vehicle per se.

* * * * *

UNITED STATES PATENT AND TRADEMARK OFFICE
CERTIFICATE OF CORRECTION

PATENT NO. : 6,727,448 B2
DATED : April 27, 2004
INVENTOR(S) : Atsuo Takahashi et al.

It is certified that error appears in the above-identified patent and that said Letters Patent is hereby corrected as shown below:

Column 10,
Line 19, before "is fixed" delete "boar" and substitute -- board -- in its place.
Line 45, after "orthogonal" delete "direction" and substitute -- directions -- in its place.

Signed and Sealed this

Twenty-first Day of December, 2004

JON W. DUDAS
*Director of the United States Patent and Trademark Office*